(12) United States Patent
Matura et al.

(10) Patent No.: US 7,753,401 B2
(45) Date of Patent: Jul. 13, 2010

(54) FLEXIBLE AIRBAG CASE

(75) Inventors: Hervé Matura, L'Isle d'Abeau (FR);
Benoit Bouquier, Lyons (FR)

(73) Assignee: Zodiac Automotive US Inc., Tempe, AZ (US)

( * ) Notice: Subject to any disclaimer, the term of this patent is extended or adjusted under 35 U.S.C. 154(b) by 488 days.

(21) Appl. No.: 11/655,361

(22) Filed: Jan. 19, 2007

(65) Prior Publication Data
US 2007/0164542 A1 Jul. 19, 2007

Related U.S. Application Data

(60) Provisional application No. 60/760,184, filed on Jan. 19, 2006.

(51) Int. Cl.
B60R 21/20 (2006.01)
(52) U.S. Cl. .................................. 280/728.2; 280/732
(58) Field of Classification Search ............. 280/728.2, 280/729, 732, 730.2
See application file for complete search history.

(56) References Cited

U.S. PATENT DOCUMENTS

| 5,393,090 | A | | 2/1995 | Shepherd et al. | |
|---|---|---|---|---|---|
| 5,498,030 | A | | 3/1996 | Hill et al. | |
| 6,186,534 | B1 | * | 2/2001 | Heinz | 280/728.2 |
| 6,209,907 | B1 | * | 4/2001 | Fischer | 280/728.3 |
| 6,447,005 | B2 | * | 9/2002 | Alb et al. | 280/730.2 |
| 6,517,102 | B2 | * | 2/2003 | Kolb | 280/728.3 |
| 6,644,686 | B2 | * | 11/2003 | Saelzle | 280/728.3 |
| 6,923,471 | B2 | * | 8/2005 | Salzle | 280/728.2 |
| 7,625,005 | B2 | * | 12/2009 | Saberan et al. | 280/730.2 |
| 2002/0043785 | A1 | * | 4/2002 | Saelzle | 280/728.2 |
| 2009/0250909 | A1 | * | 10/2009 | Kuhne et al. | 280/728.2 |

FOREIGN PATENT DOCUMENTS

DE   197 05 829 C1   5/1998
WO   WO 2005/100104 A1   10/2005

OTHER PUBLICATIONS

International Search Report in related Application No. PCT/US2007/001637.

* cited by examiner

*Primary Examiner*—Paul N Dickson
*Assistant Examiner*—Karen Jane J Amores
(74) *Attorney, Agent, or Firm*—Dean W. Russell; Jason D. Gardner; Kilpatrick Stockton LLP

(57) ABSTRACT

Certain aspects and embodiments of the present invention provide an airbag case at least partly made from a relatively flexible material. The flexible material can be configured to provide the airbag components with the ability to connect to the vehicle and provide a channel to guide the flexible membrane upon expansion. In some embodiments, the airbag case includes a pocket formed from the folded flexible material. The pocket may receive a gas generator and a bag and attached to a cover or dashboard and the vehicle.

7 Claims, 3 Drawing Sheets

FLEXIBLE AIRBAG CASE

CROSS REFERENCE TO RELATED APPLICATIONS

This application claims benefit to U.S. Provisional Patent Application Ser. No. 60/760,184, entitled "Airbag Box Made Out Of Fabric" and filed Jan. 19, 2006, the entire contents of which are hereby incorporated by this reference.

FIELD OF THE INVENTION

The present invention relates generally to airbags and more particularly to airbag cases having a relatively flexible portion.

BACKGROUND OF THE INVENTION

Generally, an airbag is a structure that includes an inflatable safety bag, such as a flexible membrane, that can be inflated to contain air or some other gas. Airbags are commonly used to rapidly inflate and provide cushioning during an vehicle collision. For example, an airbag can be installed in a steering wheel of a vehicle and associated with a sensor that, upon sensing a collision with force exceeding a certain threshold, triggers the airbag to expel a gas and deploy the safety bag to provide cushioning for the individual in the vehicle.

Typical airbags include an airbag case or module made from metal or ridged plastic and connected to the vehicle, such as a dashboard or steering wheel cover. A gas generator is attached to the airbag case, along with an inflatable safety bag. Upon a collision with a force exceeding a certain threshold and sensed by the sensor, the gas generator releases gas to expand the safety bag and force the dashboard or cover to open. The airbag case can provide for the attachment of the gas generator, safety bag, and cover to the vehicle and absorb ejection forces of the dashboard or cover and safety bag. The airbag case can also provide a channel for the safety bag to follow upon deployment to prevent the safety bag from deploying through an opening other than the cover.

Metallic or plastic airbag cases, however, generally must be manufactured separate from the other airbag components and can be relatively bulky, heavy, and rigid. For example, the metallic airbag case is formed using a molding process while a plastic and the airbag components are assembled inside the airbag case, thereby requiring several steps to completely assemble an airbag. Metallic or plastic airbag cases may also require a safety bag having relatively large number of reinforcements to secure the safety bag. Furthermore, metallic airbag cases may vibrate, allow metallic parts to contact, and cause noise or performance erosion of the metallic parts. Accordingly, a need exists for a more versatile airbag case that provides support for airbag components and a channel for the safety bag upon deployment.

SUMMARY OF THE INVENTION

Certain aspects and embodiments of the present invention provide an airbag case at least partly made from a relatively flexible material. The flexible material can be configured to provide the airbag components with the ability to connect to the vehicle and provide a channel to guide the inflatable safety bag upon expansion. In some embodiments, the airbag case includes a pocket formed from the folded flexible material. The pocket may receive a gas generator and the safety bag and be attached to a cover or dashboard associated with a vehicle or other structure in which the airbag is installed. For example, the pocket may be connected directly to the cover or vehicle or through an adaptive or intermediate part that provides an interface between the cover or vehicle and the pocket.

In some embodiments of the present invention an airbag case is formed from flexible material, such as fabric, and includes a back portion and at least two side portions. The back portion and the at least two side portions can form a pocket for receiving a gas generator and an inflatable safety bag. The pocket may define a channel for guiding the safety bag after the safety bag deploys. The airbag can be connect to a vehicle component using a zipper, glue, clip, snap ring, or other connective device.

In some embodiments of the present invention, the airbag case may include a pocket formed by folding a flexible material and an inflatable safety bag and gas generator inserted at least partially into the pocket.

In some embodiments of the present invention, an airbag case may be created using a flexible material that includes first and second fold areas and first and second end areas. The second fold area is folded onto the first fold area and the first and second end areas are folded onto the second fold area to form the airbag case and define a pocket having at least three sides. One of the sides can include an extended portion that can be attached to a vehicle component. The pocket can receive a gas generator and an inflatable safety bag.

Optional, non-exclusive objects of the present invention include a pocket that can be assembled in the same process as the inflatable safety bag.

Another optional, non-exclusive object of the present invention includes a pocket that can be modified, such as by changing the shape or configuration within an installation and without retooling or otherwise requiring the reassembly or remanufacture of the airbag case.

An additional optional, non-exclusive object of the present invention is to provide airbag cases that can be relatively lightweight and/or small to provide an installer or airbag manufacturer with the ability to create and install airbags in otherwise unavailable areas on a unit such as a vehicle.

An additional optional, non-exclusive object of the present invention is to provide a pocket that can supports the inflatable safety bag thermally and structurally such that the number of reinforcing structures in the bag may be decreased or even eliminated.

Other objects, features, and advantages of the present invention will become apparent with reference to the remainder of the text and the drawings of this application.

DETAILED DESCRIPTION OF THE INVENTION

Airbags according to some embodiments of the present invention include an airbag case having a pocket formed by folding a relatively flexible material. The flexible material may include any type of material that is relatively flexible.

Figure 1A:
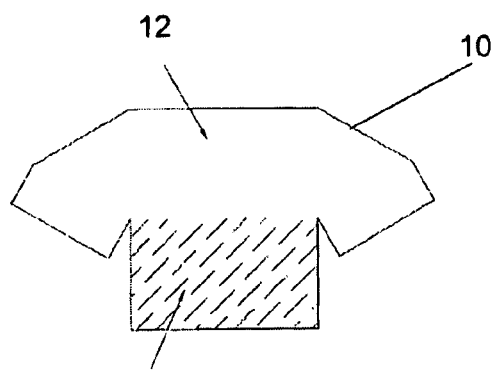
FIGS. 1a-c are top views of an airbag case formed from a flexible material according to one embodiment of the present invention.
Figure 1B:
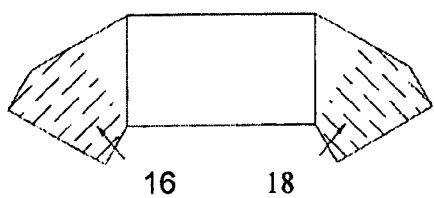
Figure 1C:
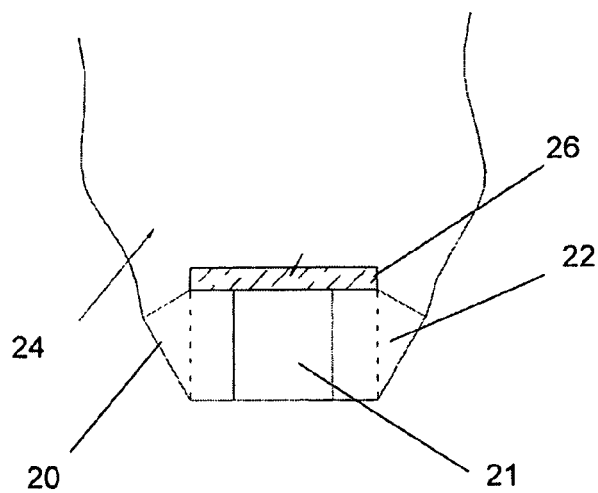

Examples of such material includes fabric, such as knitting or woven fabric with one or a combination of synthetic, natural, aramide or metallic fibers. The flexible material may also be uncoated or coated with a substance such as silicon. The flexible material may also be calandered, for example with silicon rubber. Calendered flexible material may assist in gluing the flexible material. FIGS. 1a-c illustrate one example of a flexible material 10 used to form an airbag case. The flexible material 10 may be made by cutting a desired shape from a flexible material. For example, the flexible material 10 shown in FIG. 1a contains a shape defining a first fold area 12 and a second fold area 14. The first fold area 12 also includes a first end area 16 and a second end area 18, as shown in FIG. 1b.

A pocket, such as pocket 20 in FIG. 1c, can be formed from the flexible material 10 by folding the areas of the flexible material 10. For example, second fold area 14 can be folded over first fold area 12 to form a pocket back portion 21. First end area 16 and second end area 18 can be folded over second fold area 14 to form pocket sides 22. Once the pocket 20 is formed, an inflatable safety bag 24 can be positioned inside the pocket 20. In some embodiments, the first end area 16 and second end area 18 are partially folded over second fold area 14 to form the pocket 20. The safety bag 24 can also be attached to the pocket 20. For example, the safety bag 24 can be glued, bonded, or sewed to the pocket 20.

A pocket extended portion 26 can remain detached from the safety bag 24 and be attached to a unit or vehicle component, such as a cover or dashboard, directly or through an attachment interface. For example, the extended portion 26 can be attached to the cover or dashboard using a zip fastener. A first part of the zip fastener can be sewn or glued to the extended portion 26 and a zip fastener second part can be molded to the cover or dashboard by casting. The pocket 20 is then attached to the cover or dashboard by zipping the fastener. In the embodiment shown in FIG. 1c, the extended portion 26 is located on the back portion 21 of the pocket but may be located on another portion of the pocket 20.

The extended portion 26 may also be attached to the cover or dashboard by clips or a snap ring. A first portion of the clip or snap ring can be attached to the pocket 20 by sewing or molding the clip first portion to the extended portion 26 while a second clip or snap ring portion can be molded directly in the cover or dashboard. The pocket 20 is then attached to the cover or dashboard by clipping or inserting the snap ring first portion in the corresponding second clip or snap ring second portion.

Figure 2:
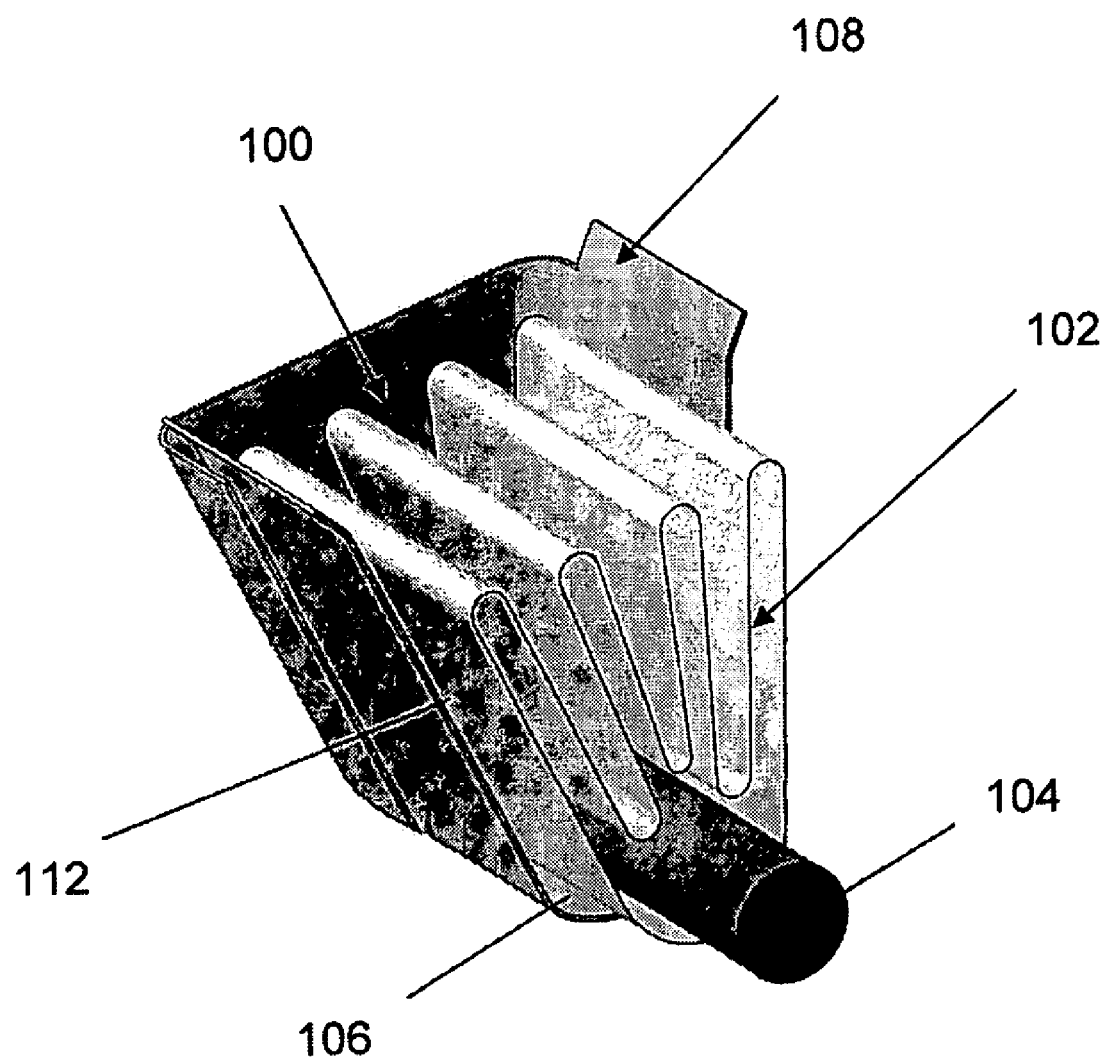
FIG. 2 is a perspective view of an airbag case associated with a safety bag and gas generator according to one embodiment of the present invention.

FIG. 2 shows an airbag case 100 receiving a folded inflatable safety bag 102 and a gas generator 104. The airbag case 100 can be formed by folding a flexible material to a desired position and then unfolding a portion of the flexible material to form a pocket 106. The folded safety bag 102 can be positioned inside the pocket 106 and glued or sewed to the pocket 100. The pocket 106 can define a channel 112 for guiding the safety bag 102 after the safety bag 102 deploys.

A pocket extended portion 108 may be detached from the folded safety bag 102 and connected to a cover or dashboard directly or using attachments as described in more detail below in connection with FIG. 3. The gas generator 104 may also be received by the pocket 106. In some embodiments of the present invention, the pocket 100 may include openings to allow the passage of anchoring pins to secure the gas generator 104 to structures associated with a vehicle or electronic wires, such as a wire to an airbag sensor.

Figure 3:
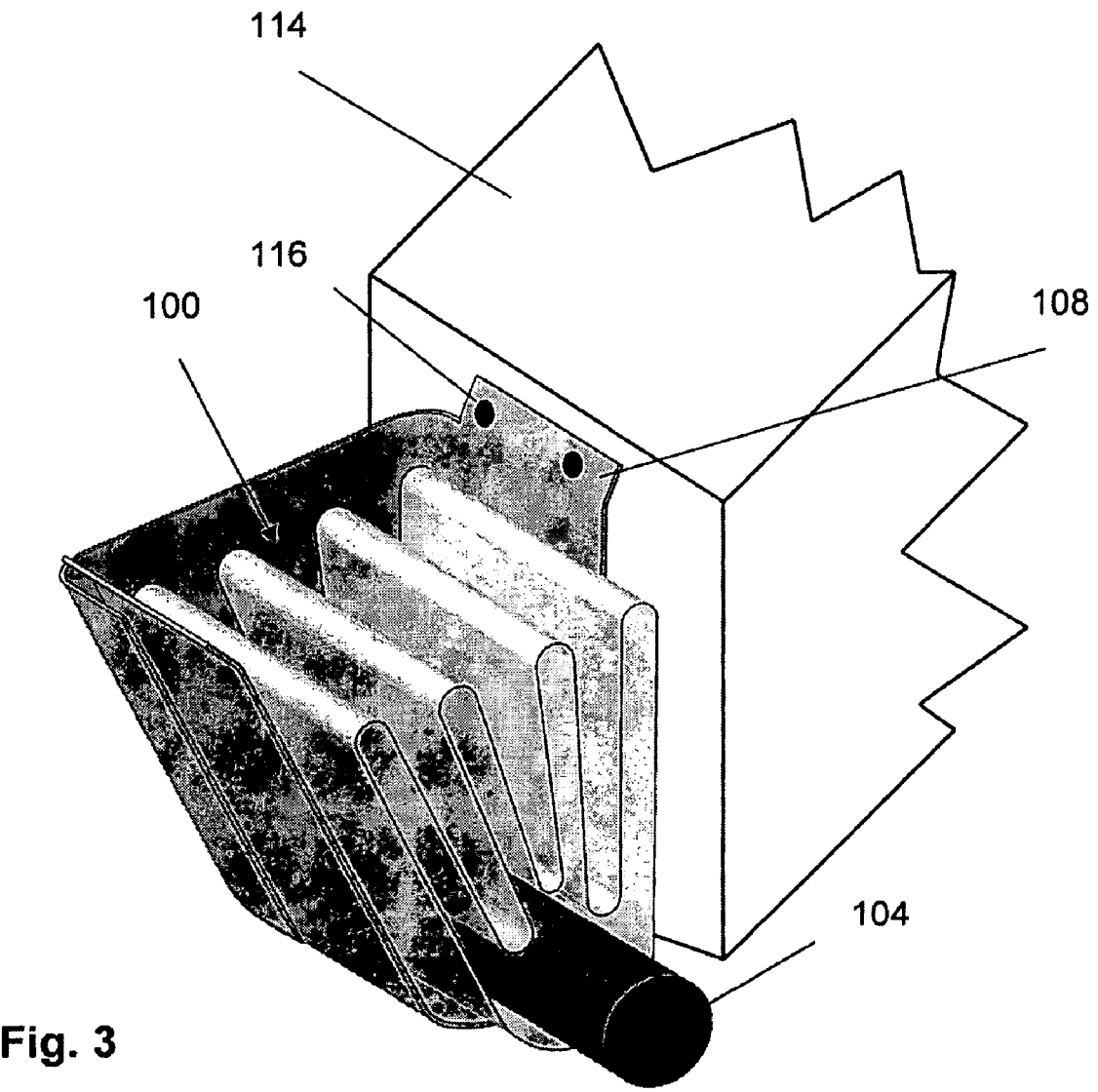
FIG. 3 is a perspective view of the airbag case of FIG. 2 connected to a vehicle component according to one embodiment of the present invention.

FIG. 3 shows the airbag case 100 of FIG. 2 attached a vehicle component 114. A pocket extended portion 108 can remain detached from the safety bag 102 and be attached to a vehicle component 114 directly or through an attachment interface 116. For example, the attachment interface 116 can be a zip fastener sewn or glued to the extended portion 108 and a zip fastener second part can be molded to the vehicle component 114. The extended portion 108 is then attached to the vehicle component 114 by zipping the fastener.

In some embodiments of the present invention, the attachment interface 116 may be clips or a snap ring. For example, a first portion of the clip or snap ring can be attached to the extended portion 108 by sewing or molding the clip first portion to the extended portion 108 while a second clip or snap ring portion can be molded directly in the vehicle component 114. The extended portion 108 is then attached to the vehicle component 114 by clipping or inserting the snap ring first portion in the corresponding second clip or snap ring second portion.

The foregoing is provided for purposes of illustrating, explaining, and describing embodiments of the present invention. Further modifications, adaptations and additional components added to these embodiments will be apparent to those skilled in the art and may be made without departing from the scope or spirit of the invention.

What is claimed is:

1. An airbag comprising:
  a gas generator;
  an inflatable safety bag;
  an airbag case formed from a flexible material, the airbag case comprising:
    a second fold area folded onto a first fold area; and
    a first end area and a second end area that are folded onto the second fold area folded onto the first fold area,
  to define a pocket having only three sides for receiving the gas generator and the inflatable safety bag,
  wherein the inflatable safety airbag is connected to the airbag case by being glued to the airbag case.

2. The airbag of claim 1, wherein the airbag case further comprises a extended portion for connecting the airbag case to a vehicle component.

3. The airbag of claim 2, wherein the airbag case is connected to the vehicle component using an attachment interface.

4. The airbag of claim 1, wherein the inflatable safety bag is connected to the airbag case by being glued and sewed to the airbag case.

5. The airbag of claim 1, wherein the airbag case further comprises at least one opening.

6. The airbag of claim 1, wherein the flexible material is fabric.

7. The airbag of claim 1, wherein the pocket defines a channel for guiding the safety bag after the safety bag deploys.

* * * * *